(12) United States Patent
Lyons et al.

(10) Patent No.: US 11,981,422 B2
(45) Date of Patent: May 14, 2024

(54) AIRCRAFT WING AND WING TIP DEVICE

(71) Applicant: AIRBUS OPERATIONS LIMITED, Bristol (GB)

(72) Inventors: Neil John Lyons, Bristol (GB); Ben Commis, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/451,289

(22) Filed: Oct. 18, 2021

(65) Prior Publication Data

US 2022/0089277 A1 Mar. 24, 2022

Related U.S. Application Data

(62) Division of application No. 16/203,569, filed on Nov. 28, 2018, now Pat. No. 11,174,008.

(30) Foreign Application Priority Data

Nov. 29, 2017 (GB) ...................................... 1719806
Dec. 28, 2017 (GB) ...................................... 1722138

(51) Int. Cl.
*B64C 23/06* (2006.01)
*B64C 9/00* (2006.01)
(Continued)

(52) U.S. Cl.
CPC .............. *B64C 23/076* (2017.05); *B64C 9/14* (2013.01); *B64C 9/16* (2013.01); *B64C 9/18* (2013.01);
(Continued)

(58) Field of Classification Search
CPC ........................ B64C 2009/005; B64C 23/076
See application file for complete search history.

(56) References Cited

U.S. PATENT DOCUMENTS 2,576,294 A   11/1951   Geraci
3,260,481 A    7/1966   Winborn
(Continued)

FOREIGN PATENT DOCUMENTS

EP   0113466    7/1984
EP   1640264    3/2006
(Continued)

OTHER PUBLICATIONS

Combined Search and Examination Report for GB 1719806.0 dated May 25, 2018, 7 pages.
(Continued)

*Primary Examiner* — Philip J Bonzell
*Assistant Examiner* — Ashesh Dangol
(74) *Attorney, Agent, or Firm* — Nixon & Vanderhye P.C.

(57) ABSTRACT

An aircraft wing is disclosed having a root end, a tip end, a span extending between the root end and the tip end, a leading edge, a trailing edge and a chord extending between the leading edge and the trailing edge, and including a main fixed wing portion having an inboard portion adjacent the root end, and an outboard portion adjacent the tip end. A wing tip device attached to the tip end of the wing; and a movable flight control surface connected at the outboard portion of the main fixed wing portion and having a leading edge, a trailing edge and a chord extending between the leading edge and the trailing edge. A ratio of the local chord length of the movable flight control surface to the local chord length of the wing varies in the spanwise direction.

10 Claims, 8 Drawing Sheets

(51) Int. Cl.
*B64C 9/14* (2006.01)
*B64C 9/16* (2006.01)
*B64C 9/18* (2006.01)
*B64F 5/10* (2017.01)

(52) U.S. Cl.
CPC ...... *B64C 23/065* (2013.01); *B64C 2009/005* (2013.01); *B64F 5/10* (2017.01)

(56) References Cited

U.S. PATENT DOCUMENTS

| | | | |
|---|---|---|---|
| 5,407,153 A | 4/1995 | Kirk et al. | |
| 5,988,563 A | 11/1999 | Allen | |
| 7,900,877 B1 | 3/2011 | Guida | |
| 2005/0011994 A1* | 1/2005 | Sakurai | B64C 9/16 244/212 |
| 2005/0224662 A1 | 10/2005 | Lacy et al. | |
| 2007/0018049 A1 | 1/2007 | Stuhr | |
| 2014/0306067 A1 | 10/2014 | Guida | |
| 2016/0009378 A1* | 1/2016 | Guida | B64C 23/072 244/199.4 |
| 2018/0029696 A1* | 2/2018 | Guida | B64C 13/16 |
| 2018/0170515 A1* | 6/2018 | Kordel | B64F 5/00 |
| 2023/0227144 A1* | 7/2023 | Theurich | B64C 3/385 244/201 |

FOREIGN PATENT DOCUMENTS

| | | |
|---|---|---|
| GB | 225257 | 11/1924 |
| WO | 2017151580 | 9/2017 |

OTHER PUBLICATIONS

Extended European Search Report for European Application No. 18207708.1, 15 pages, dated Aug. 5, 2019.

* cited by examiner

AIRCRAFT WING AND WING TIP DEVICE

FIELD OF THE INVENTION

This application is a Divisional application of U.S. patent application Ser. No. 16/203,569, filed Nov. 28, 2018, now allowed, which claims priority to United Kingdom patent application GB 1719806.0, filed Nov. 29, 2017, and United Kingdom patent application GB 1722138.3, filed Dec. 28, 2017, the entire contents of each of which is hereby incorporated by reference.

The present invention relates to a method of retrofitting a wing of a fixed wing aircraft with a wing tip device and movable flight control surface. The invention also relates to the retrofitted aircraft wing.

BACKGROUND OF THE INVENTION

In order to improve aircraft performance, some aircraft have been retrofitted with wing tip devices such as winglets, wing tip fences, span extensions or similar. This has become a common performance improvement package in the aviation industry. Retrofitting a wing tip device to an existing wing may be driven by a desire to improve the aircraft performance and may result in a change in the aircraft span loading across the wing.

However, this alteration to the span loading of the wings is often not optimised without also making alterations inboard of the wing tip, especially to aircraft designed without a wing tip device or designed before modern computational fluid dynamics (CFD) techniques.

These alterations have previously consisted of positional angle changes to the flight control surface, or modifications to the 'falsework' outboard of the aircraft flight control surfaces.

SUMMARY OF THE INVENTION

A first aspect of the invention provides a method of retrofitting a wing of a fixed wing aircraft. The method comprises the steps of providing an existing aircraft wing with a main fixed wing portion; the main fixed wing portion having a tip end and an existing movable flight control surface connected adjacent the tip end. The existing movable flight control surface is then removed from the main fixed wing portion, and a wing tip device and movable flight control surface are selected as a pair to replace the existing movable flight control surface, with the selected movable flight control surface having an aerodynamic surface of different shape to the shape of the flight control surface removed from the wing. The selected wing tip device and movable flight control surface are then fitted to the main fixed wing portion.

The invention is advantageous in that the wing loading in the presence of a retrofit-able wing tip device can be better optimised through shape changes to the flight control surface. This can improve the operational flexibility of the aircraft by increasing the viable economic Mach range, and better optimising the lift to drag ratio at a given time or phase of flight.

This invention gives potential to reduce the wing induced drag by modifying the span loading in the presence of the new tip device:
  Improving the 'K' factor (Oswald efficiency)
  Adjusting the spanwise centre of pressure
  Additional potential benefits may include:
  Improved compressibility drag
  Greater scope for tip device development with continuity of surface with improved performance and visual benefits.
  Re-optimising for a given wing bending target These changes may favourably redistribute the local load, more than is achievable by just retrofitting a wing tip device, leading to aircraft level advantages such as:
  Improved fuel burn
  Improved climb Retrofitting in this context refers to the addition of one or more differently shaped components to a device or structure that either did not have the component(s) or had differently shaped component(s) when it was first manufactured. Retrofitting does not here extend to repairs to an aircraft wing in which a component is replaced by a substantially identically designed component.

Wing tip device refers to any device attached at the outboard 'tip' end of the wing that aims to reduce drag by favourable redistribution of the aircraft's lifting system. Wing tip devices may take a wide variety of forms, including but not limited to wing tip fences, winglets, Kucheman tips, blended winglets, canted winglets, raked wing tips, non-planar wing tip extensions and split wing tips.

Retrofitting the flight control surface improves the span loading, helping to maximise the benefits of a retrofitted wing tip device, without requiring internal structural alterations to the main wing portion. By selecting the wing tip device and movable flight control surface as a complimentary pair or package, improvements are made in comparison to simply providing a positional angle change of the existing control surface.

Preferably the main fixed wing portion has a common connection (structural and systems) to the existing movable flight control surface and the selected movable flight control surface, enabling the retrofit with minimal changes to the main fixed wing portion.

This allows the retrofitting process to be less labour intensive, more efficient, and without the need to structurally reconfigure the internal profile, mechanisms or systems of the wing.

The selected flight control surface may have a different chord length, chamber, thickness or planform area in comparison to the existing flight control surface.

Chord length is the distance, measured in a straight line, between the leading edge and trailing edge of an aerodynamic (i.e. aerofoil) section.

Camber is defined as the asymmetry between the top and bottom aerodynamic surfaces of an aerofoil section, such that a symmetric section will have no camber. The camber line is an imaginary line drawn equidistant between the top and bottom aerodynamic surfaces of an aerofoil section. This means the length of the camber line will be equal to the chord length for a symmetric aerofoil section.

The thickness of an aerodynamic section defines the distance between the top and bottom aerodynamic surfaces, measured perpendicular to the chord line and spanwise direction.

The planform area is defined here as the projected area of an object when viewed from an angle perpendicular to the spanwise direction of the wings and longitudinal direction of the fuselage.

The existing aircraft wing may have an existing wing tip device connected at the tip end of the main fixed wing portion, so that the method also includes the step of removing the existing wing tip device from the main fixed wing portion. Alternatively the existing aircraft wing may have no existing wing tip device.

Whilst the retrofitting method is particularly relevant to aircraft designed initially without a wing tip device, as the outer wing loading is expected to be less than optimal when the wing tip device is retrofitted, there are also advantages to retrofitting movable flight control surfaces to aircraft wings designed initially with a wing tip device due to the change in outer wing loading expected when a new wing tip device is retrofitted. This is particularly relevant for aircraft designed prior to modern computational fluid dynamics (CFD) techniques, which may not have had ideal wing loading when the wing tip device was retrofitted.

The existing flight control surface and the selected flight control surface may have a substantially identical leading edge shape.

This means that the shape of the trailing edge of the main wing portion, where the leading edge of the existing flight control surface sits, is also suitable to accommodate the leading edge of the selected flight control surface. This commonality allows the selected control surface to be retrofitted more easily, and without substantial structural alteration.

The movable flight control surface may be an aileron, flaperon or other control surface configured to provide roll control.

A flaperon is a control surface configured to perform the function of both an aileron and a flap.

The selected wing tip device may include a winglet. A winglet is a wing-like lifting surface projecting upwardly (an 'uplet') or downwardly (a 'downlet') from the wing. The wing tip device may include both an uplet and a downlet, e.g. a split winglet. The winglet may be a 'blended winglet' where the upper and lower surfaces together with the leading and trailing edges smoothly transition from the tip end of the wing into the winglet at the intersection.

The selected wing tip device may be blended into the tip end of the main fixed wing portion. This can improve the aerodynamic performance at the outboard end of the aircraft wing.

The selected wing tip device may include a wing tip extension.

The selected wing tip device may be fixed so as to be non-movable with respect to the main fixed wing portion. In this context this means that the tip device is not actuated to move relative to the wing to which it is attached.

The selected wing tip device may include at least a movable portion. In this context this means that at least a portion of the tip device is actuated to move relative to the wing to which it is attached.

A second aspect of the invention provides an aircraft wing having a root end, a tip end, a span extending between the root end and the tip end, a leading edge, a trailing edge and a chord extending between the leading edge and the trailing edge. The aircraft wing also has a main fixed wing portion, having an inboard portion adjacent the root end and an outboard portion adjacent the tip end, as well as a wing tip device attached to the tip end of the wing; and a movable flight control surface connected at the outboard the outboard portion of the main fixed wing portion. The movable flight control surface has a leading edge, a trailing edge and a chord extending between the leading edge and the trailing edge. The ratio of the local chord length of the movable flight control surface to the local chord length of the wing varies in the spanwise direction.

Retrofitting with a selected flight control surface may change the outer wing loading and further improve the performance benefits provided by the selected wing tip device.

The ratio of the local chord length of the movable flight control surface to the local chord length of the wing may increase in the spanwise direction, or it may decrease in the spanwise direction.

The leading edge and/or trailing edge of the movable flight control surface may be straight.

A third aspect of the invention provides an aircraft wing having a root end and a tip end, a main fixed wing portion having an inboard portion adjacent the root end, and an outboard portion adjacent the tip end, a wing tip device attached to the tip end of the wing; and a movable flight control surface connected at the outboard portion of the main fixed wing portion. The movable flight control surface has an inboard edge and an outboard edge, and is configured to be movable between a neutral position and at least one deployed position. A camber of an aerofoil section of the wing including the inboard edge of the movable flight control surface in the neutral position is different than a camber of an aerofoil section of the wing just inboard of the inboard edge of the movable flight control surface.

The neutral position refers to the position of the control surface where the aerodynamic surfaces of the control surface are conformal with the upper and lower aerodynamic surfaces of the main fixed wing portion, i.e. the control surface is not in a deflected state.

A consequence of retrofitting the selected flight control surface can be that a step change in the camber is created between the main fixed wing portion and the selected movable flight control surface, across the inboard edge of the movable flight control surface in the wing spanwise direction.

The wing tip device of the second and third aspects may include a winglet.

The wing tip device of the second and third aspects may include a wing tip extension.

The wing tip device of the second and third aspects may be fixed so as to be no-movable with respect to the main wing portion.

The wing tip device of the second and third aspects may include at least a movable portion.

The wing may have a folding portion adjacent the tip end, wherein the folding portion is adapted to rotate about a generally chordwise extending hinge.

The folding portion may provide a changeable span of the wing, so that there may be a flight configuration for use during flight, and a ground configuration for use during ground-based operations. In the ground configuration, the span of the aircraft wing is reduced to accommodate aircraft span (gate) constraints at airports.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
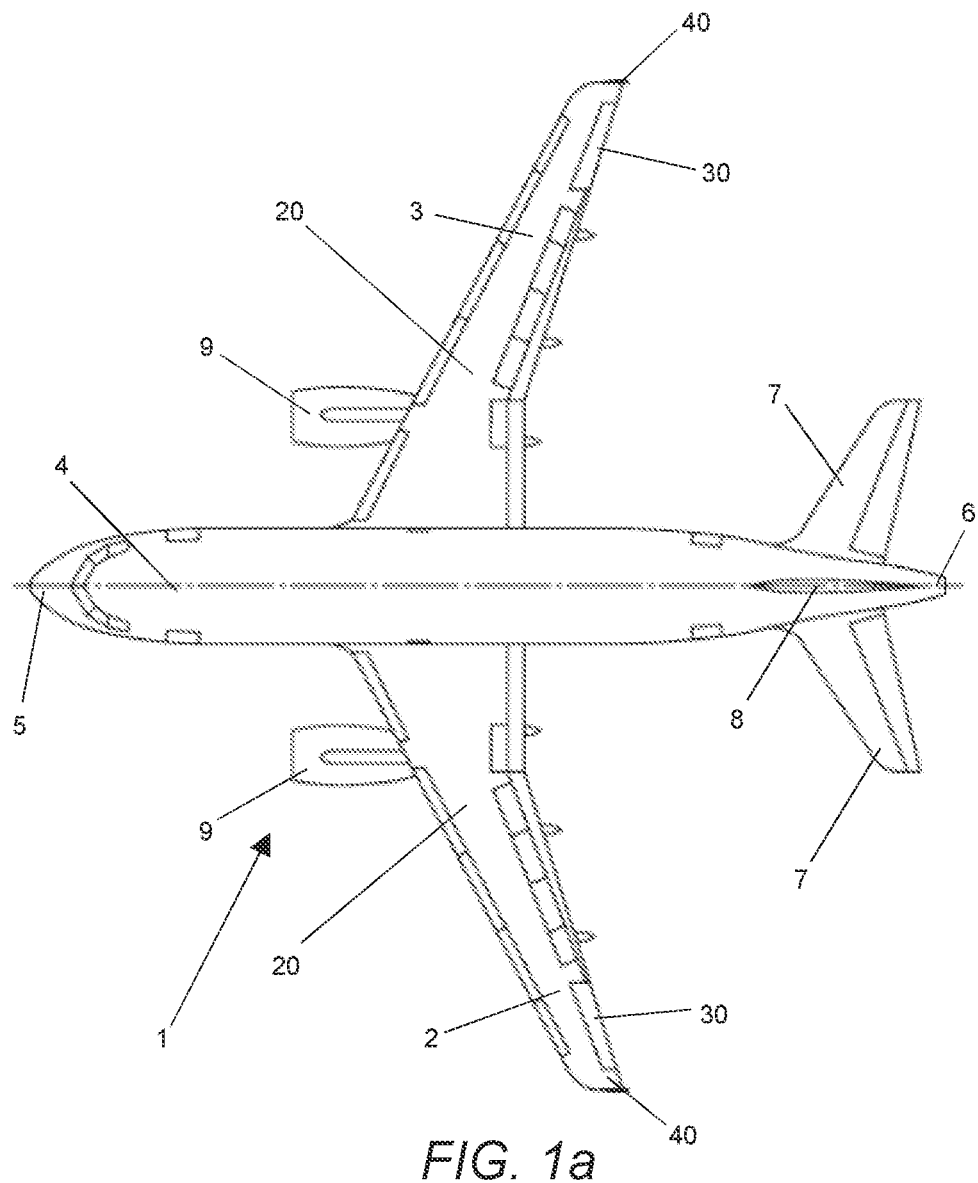
FIG. 1a is a plan view of an aircraft.

FIG. 1a shows an existing aircraft 1 with port and starboard fixed wings 2, 3, engines 9, a fuselage 4 with a nose end 5 and a tail end 6, the tail end 6 including horizontal and vertical stabilising surfaces 7, 8. The aircraft 1 is a typical jet passenger transport aircraft but the invention is applicable to a wide variety of fixed wing aircraft types, including commercial, military, passenger, cargo, jet, propeller, general aviation, etc. with any number of engines attached to the wings or fuselage.

Each wing 2, 3 of the aircraft 1 has a cantilevered structure with a length extending in a span-wise direction from a root to a tip, the root being joined to the aircraft fuselage 4. The wings include a main fixed wing portion 20 and a movable flight control surface 30 adjacent the wing tip end, and a wing tip device 40 outboard of the movable flight control surface 30.

Figure 1B:
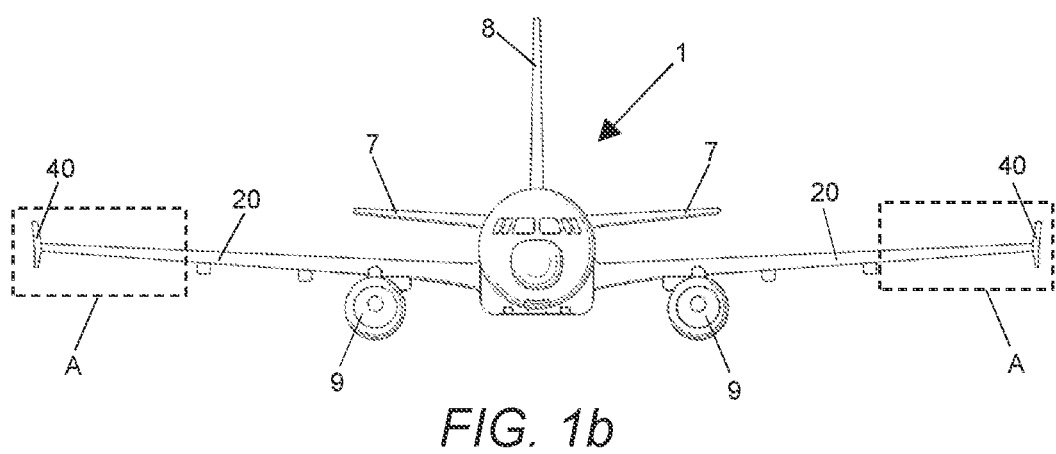
FIG. 1b is a front view of the aircraft.

The wing tip device 40 is shown to be a wing tip fence in FIG. 1b, where near vertical substantially planar portions extend upwardly and downwardly from a rounded (Kucheman) wing tip portion, although the existing aircraft 1 may be fitted with other wing tip devices or no wing tip devices as will be apparent to those skilled in the art.

Figure 2A:
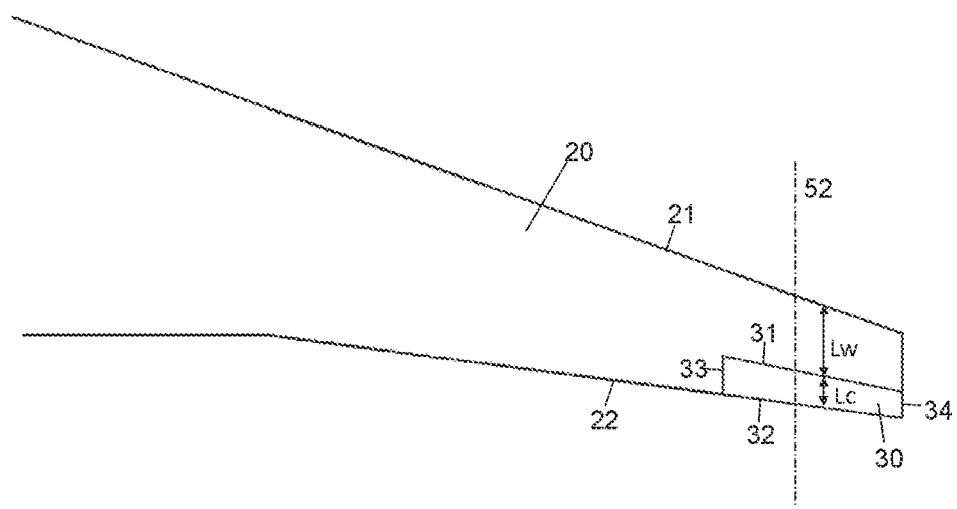
FIG. 2a shows a plan view of a first example of an existing starboard aircraft wing to be retrofitted.

The invention generally relates to retrofitting the wings 2, 3, and in particular to retrofitting the outboard wing portion. This outboard wing portion is indicated in FIG. 1b by a box in broken line, A. FIG. 2a shows a simplified schematic of the starboard wing 3 of the aircraft 1 with no wing tip device attached, with a main wing portion 20 and an existing movable flight control surface 30 attached to the main wing portion 20. The main wing portion 20 has a chord length, Lw, extending between a leading edge 21 and a trailing edge 22 of the main wing portion 20. The existing movable flight control surface 30 has a chord length, Lc, that extends between a leading edge 31 and a trailing edge 32 of the movable flight control surface 30. The ratio Lc/Lw of the local chord length of the existing movable flight control surface 30 to the local chord length of the main wing portion 20 is substantially constant in the spanwise direction.

The leading edge 31 and trailing edge 32 of the existing movable control surface are both straight, and extend up to an inboard edge 33 of the existing movable control surface 30 and up to an outboard edge 34 of the existing movable control surface 30.

The existing movable flight control surface 30 is removed from the main wing portion 20, and a new movable flight control surface 30a and corresponding wing tip device 40a are selected as a pair or package. The selected wing tip device 40a and selected movable flight control surface 30a are then fitted to the main wing portion 20 as shown in FIG. 2b.

The selected movable flight control surface 30a has a shape that is different to the removed (previously existing) movable flight control surface 30 so that its shape compliments the selected wing tip device 40a and optimises the wing loading. This change in shape of the selected movable wing control surface 30a may include, for example, a change in planform area, thickness, camber, chord length, or any other (external or aerodynamic) shape change apparent to those skilled in the art.

Figure 2B:
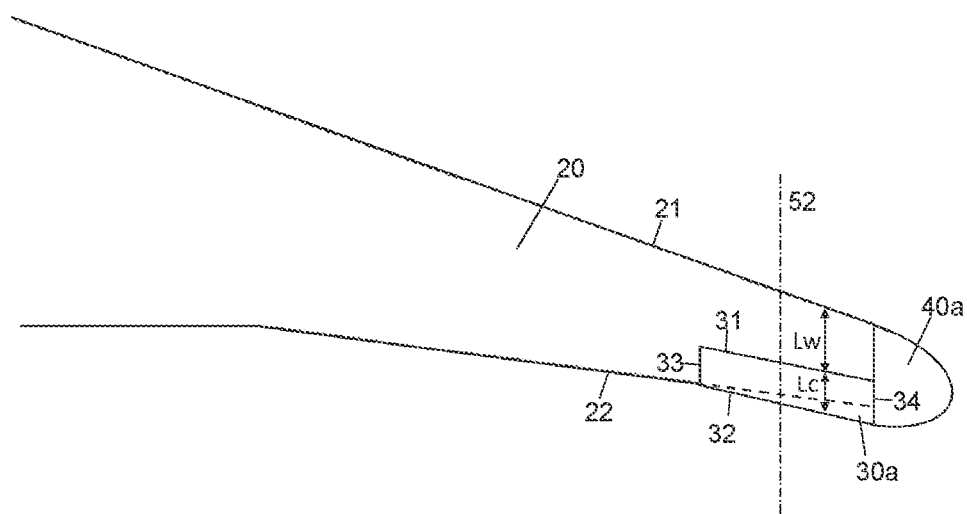
FIG. 2b shows a plan view of the wing of FIG. 2a after retrofitting with a new aileron and wing tip device package.

For instance, FIG. 2b shows the retrofitted wing 3 with the selected movable flight control surface 30a and selected wing tip device 40a, wherein the planform area of the selected movable flight control surface 30a is increased in comparison to the existing movable flight control surface 30, as indicated by the dotted-line which represents the shadow planform of the previously existing movable flight control surface. An alternative change would be to decrease the planform area of the selected movable flight control surface 30a in comparison to the previously existing movable flight control surface 30.

FIG. 2b also shows that the ratio Lc/Lw of the local chord length of the selected movable flight control surface 30a to the local chord length of the main wing portion 20 is no longer constant and now varies (e.g. increases) in the wing spanwise direction. It will also be apparent to the skilled person that the selected movable flight control surface may be retrofitted such that the ratio Lc/Lw may decrease in the spanwise direction.

Figure 2C:
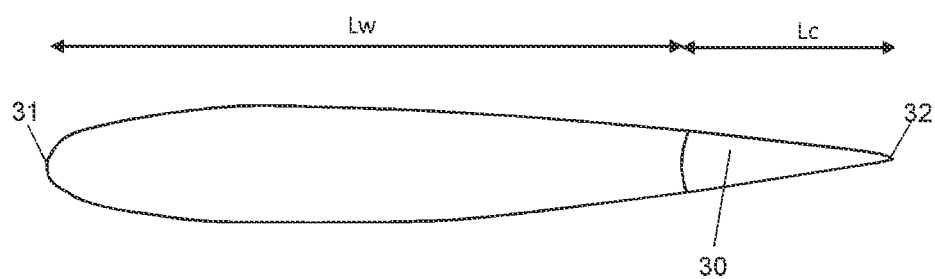
FIGS. 2c and 2d show wing profiles through the wing of FIGS. 2a and 2b, respectively.
Figure 2D:
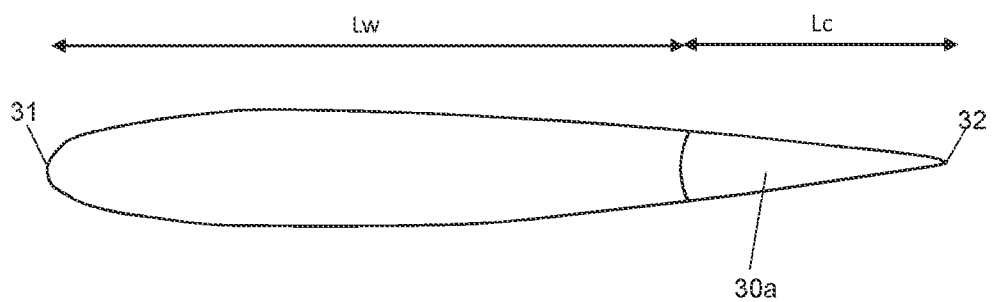

FIGS. 2c-d show section views of the existing moveable flight control surface 30 and of the selected movable flight control surface 30a at the same spanwise station 52 (shown in FIGS. 2a, 2b). As can be seen, the local chord length Lc is greater for the selected movable flight control surface 30a than for the previously existing moveable flight control surface 30. The section profile of the main fixed wing portion 20 at station 52 is unchanged in FIGS. 2c and 2d, and so Lw is the same in FIGS. 2c and 2d. The change in chord length Lc will be accompanied by a change in camber for the wing section.

It will be apparent that, as the existing movable flight control surface 30 is designed to complement the existing main wing portion 20, any retrofitted movable flight control surface 30a is also capable of causing a step change of the aerodynamic profile (aerofoil sections) across the inboard edge 33 of the movable flight control surface 30a due to the change in profile shape of the wing 3. This can, for example, be a step change in the local sectional camber along the wing spanwise direction, discussed ore below with reference to FIGS. 4e-4g.

The connection mechanism between the main wing portion 20 and the movable flight control surfaces 30, 30a also preferably remains unchanged, such that the main wing portion 20 has a common connection to both the previous movable flight control surface 30 and the newly selected movable flight control surface 30a.

Figure 3A:
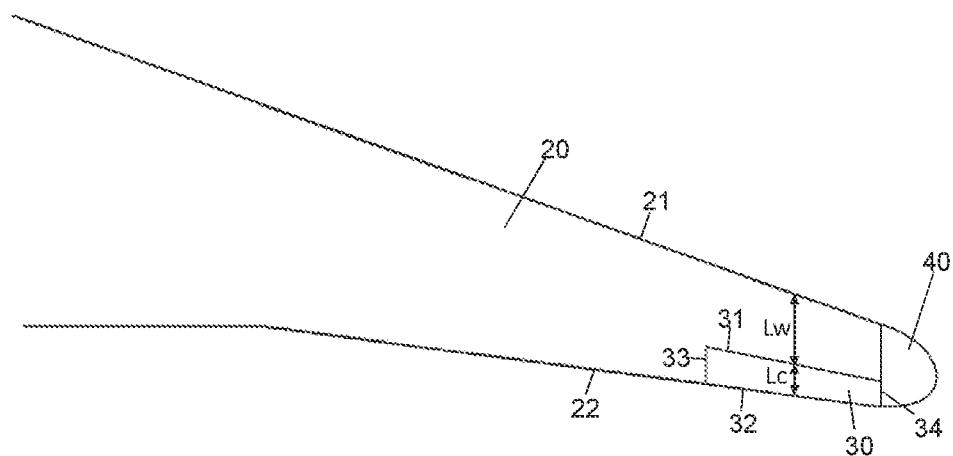
FIG. 3a shows a plan view of a second example of an existing starboard aircraft wing to be retrofitted.
Figure 3B:
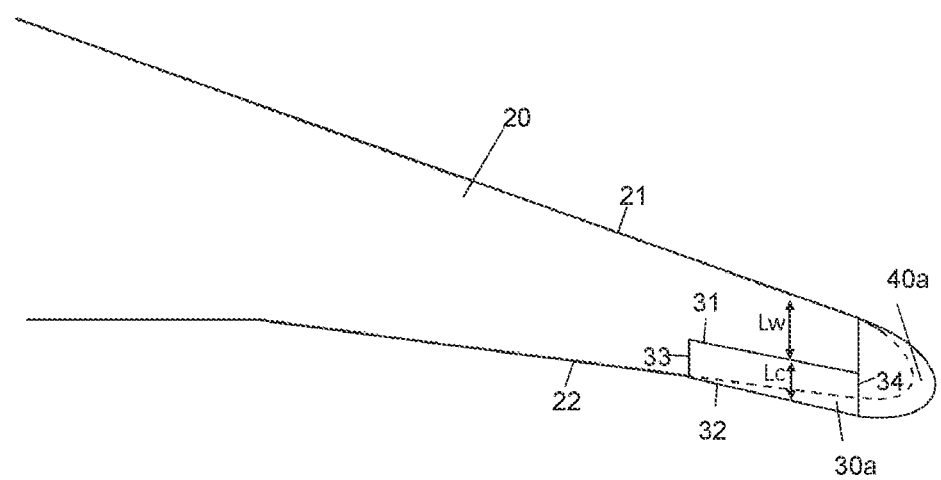
FIG. 3b shows a plan view of the wing of FIG. 3a after retrofitting with a new aileron and wing tip device package.

FIGS. 3a-b show a second embodiment substantially the same as the first embodiment shown in FIGS. 2a-d, with all common features labelled with common reference numerals. The only substantial difference being the addition of an existing wing tip device 40 to the existing wing, as shown in FIG. 3a. This embodiment therefore requires the method to also include removal of the existing wing tip device 40 as well as the removal of the existing movable flight control surface 30 from the main wing portion 20. The wing tip device 40 and the moveable flight control surface are then both replaced with a selected movable flight control surface 30a and a corresponding selected wing tip device 40a, which are selected as a pair or package. The selected wing tip device 40a and selected movable flight control surface 30a are then fitted to the main wing portion 20.

FIG. 3a shows the main wing portion 20, an existing movable flight control surface 30 attached to the main wing portion 20, and an existing wing tip device 40.

FIG. 3b shows the retrofitted wing 3 with the selected movable flight control surface 30a and selected wing tip device 40a attached to the main wing portion 20.

As shown in FIG. 3b, the selected wing tip device 40a is larger than the previously existing wing tip device 40, having a greater spanwise width and a longer chord length at the wing tip 34. The increased chord length at the wing tip 34 enables the increased planform area of the selected movable flight control surface 30a in comparison to the planform area of the previously existing movable flight control surface 30. Of course, in other examples the selected wing tip device 40a may have the same, smaller or larger dimensions than the previously existing wing tip device 40, and the selected movable flight control surface 30a will be chosen to pair with the selected wing tip device 40a.

It will be apparent that, as the existing movable flight control surface 30 is designed to complement the existing main wing portion 20, any retrofitted movable flight control surface 30a is also capable of causing a step change of the aerodynamic profile across the inboard edge 33 of the movable flight control surface 30a due to the change in profile shape of the wing 3. This can, for example, be a step change in the local sectional camber along the wing spanwise direction, discussed more below with reference to FIGS. 4e-4g.

Figure 4A:
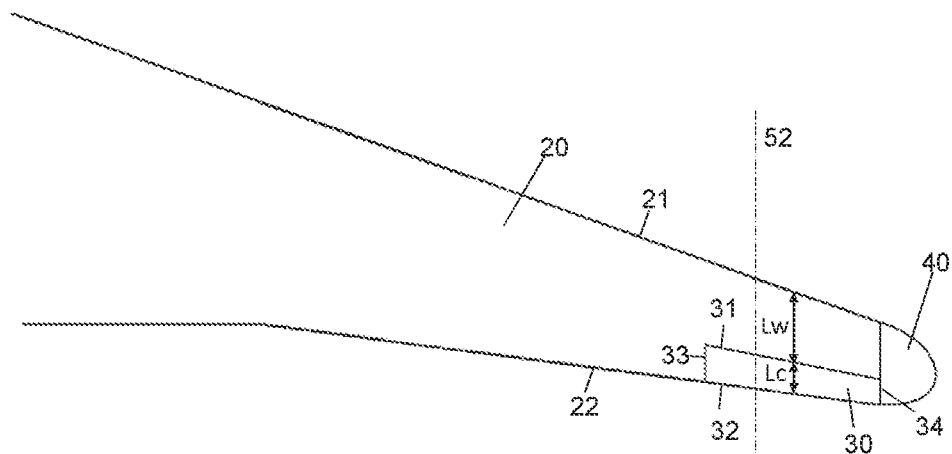
FIG. 4a shows a plan view of a third example of an existing starboard aircraft wing to be retrofitted.
Figure 4B:
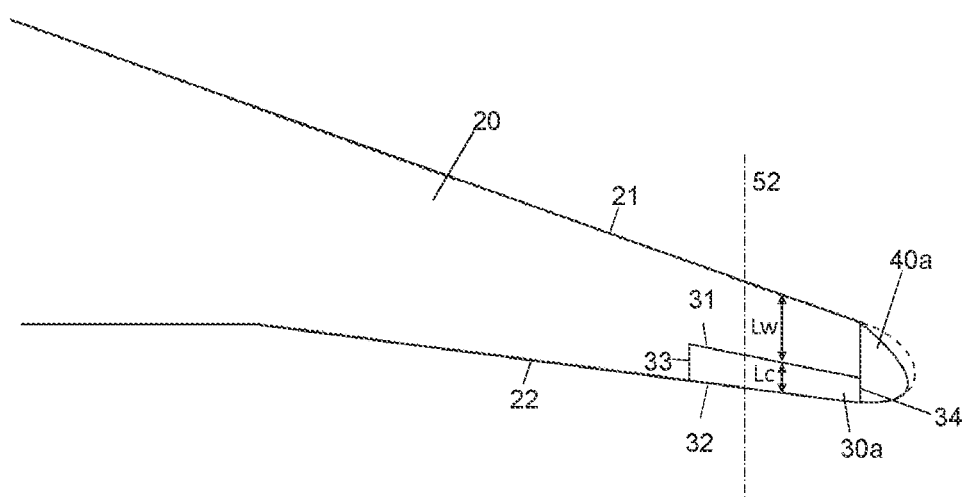
FIG. 4b shows a plan view of the wing of FIG. 4a after retrofitting with a new aileron and wing tip device package.

FIGS. 4a-b show a third embodiment substantially the same as the second embodiment shown in FIGS. 3a-b, with all common features labelled with common reference numerals. The only substantial difference being that the planform area of the selected flight control surface 30a remains substantially unchanged in comparison to the existing flight control surface 30, whilst the camber of the selected flight control surface 30a is altered in comparison to the existing flight control surface 30.

FIG. 4a shows the main wing portion 20, an existing movable flight control surface 30 attached to the main wing portion 20, and an existing wing tip device 40.

FIG. 4b shows the main wing portion 20, a selected movable flight control surface 30a attached to the main wing portion 20, and a selected wing tip device 40a. The shadow outline of the previously existing wing tip device 40 is also shown.

The result of retrofitting both a selected movable flight control surface 30a and a selected wing tip device 40a is that the wing loading can be more efficiently tailored, than it can when only retrofitting the selected wing tip device 40a, as there is a greater proportion of the aerodynamic surface that can be optimised. This is achievable without major structural alterations to the main wing portion 20 that might be otherwise required in order to extend the flight envelope.

Figure 4C:
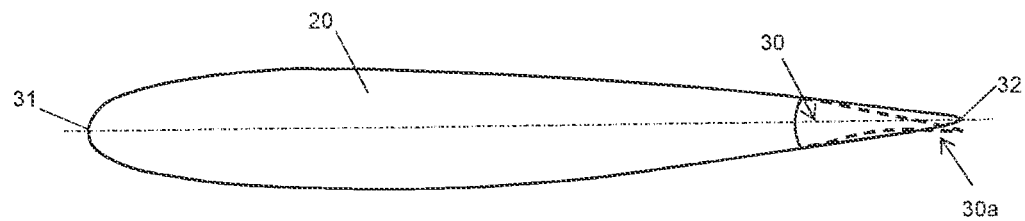
FIGS. 4c-4d show alternative wing profiles through the wing of FIG. 4b.

FIG. 4c shows a first example of a comparison between the aerofoil sectional profile at spanwise station 52 for the existing flight control surface 30 shown in FIG. 4a and the selected flight control surface 30a shown in FIG. 4b. As can be seen the re-cambered flight control surface 30a has the same chord length as the flight control surface 30 but the trailing edge 32 is positioned lower and the lower aerodynamic surface of the flight control surface 30a has higher curvature leading to a more highly cambered flight control surface.

Figure 4D:
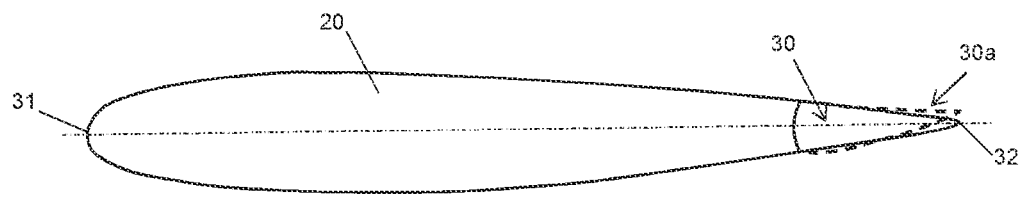

FIG. 4d shows a second example of a comparison between the aerofoil sectional profile at spanwise station 52 for the existing flight control surface 30 shown in FIG. 4a and the selected flight control surface 30a shown in FIG. 4b. As can be seen the re-cambered flight control surface 30a has the same chord length as the flight control surface 30 but the trailing edge 32 is positioned higher and the upper aerodynamic surface of the flight control surface 30a has higher curvature leading to a reflexed cambered flight control surface.

The result of the camber change may also in some circumstances mean that there is now a step change of the camber profile between the inboard edge 33 of the selected movable flight control surface 30a and the section of the main wing portion just inboard of the selected movable flight control surface 30a.

Figure 4E:
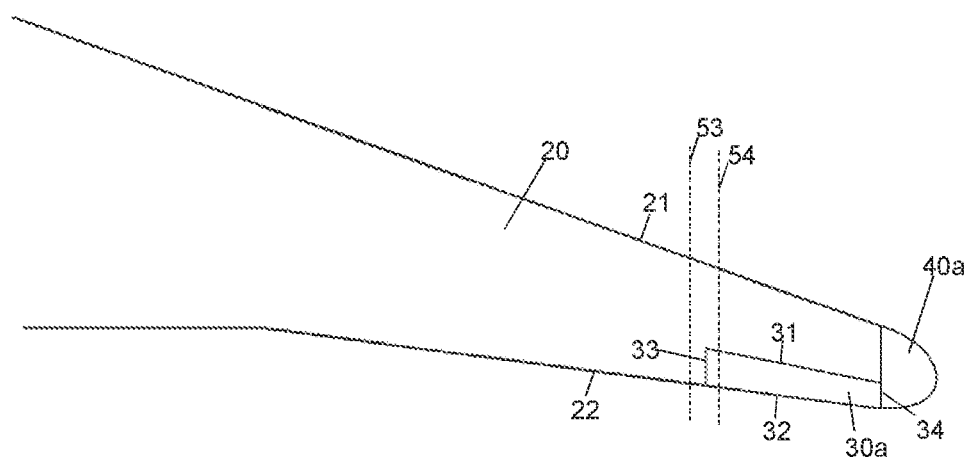
FIG. 4e shows another plan view of the wing of FIG. 4a after retrofitting with the new aileron and wing tip device package.
Figure 4F:
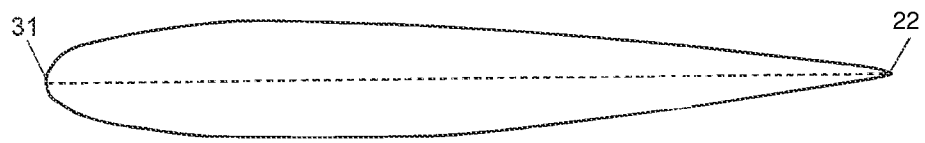
FIGS. 4f-4g show wing profiles of the retrofitted aircraft wing of FIG. 4e.
Figure 4G:
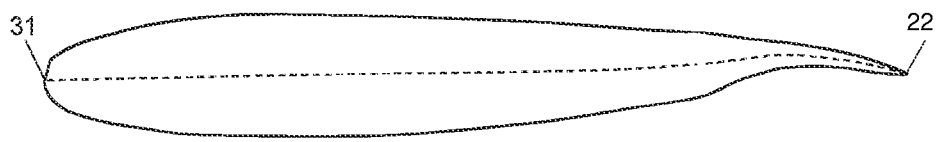

This step change in the camber can be seen in comparison of the aerodynamic profiles of FIGS. 4e-g, the camber line indicated as a dotted-line in FIGS. 4f and 4g. FIG. 4f shows the aerofoil profile at a location just inboard of the inboard edge 33 of the selected movable flight control surface 30a, indicated by spanwise station 53 in FIG. 4e. FIG. 4g shows the aerofoil profile on the selected movable flight control surface 30a at a location just outboard of the inboard edge 33, indicated by spanwise station 54 in FIG. 4e. In FIGS. 4e-g, the movable flight control surfaces 30a is shown in the neutral position, that is to say it has not been actuated to a deployed position and is in its zero degree position.

The camber difference across the inboard edge of the selected movable flight control surface 30a is observable as a sudden transition, or a step change, in the sectional profile of the wing. This may also be a feature of any of the first and second embodiments described above.

Figure 5:
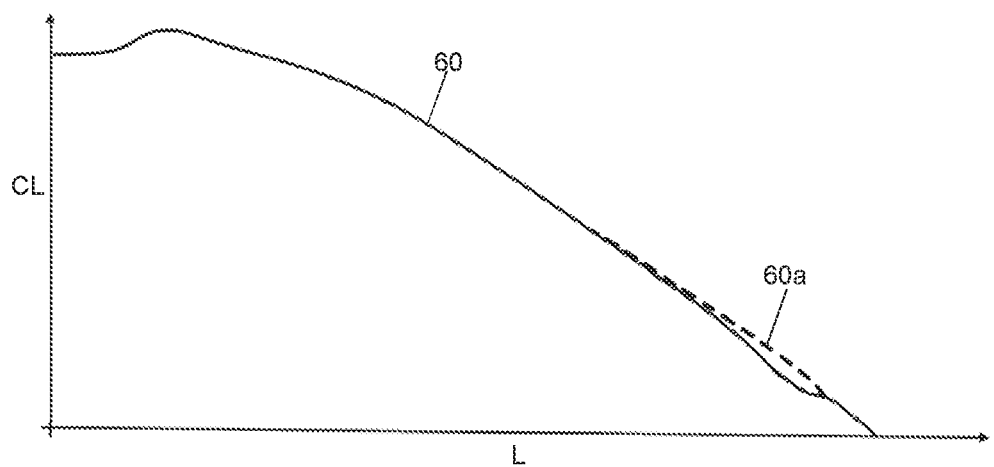
FIG. 5 shows an exemplary comparison of the wing span loading before and after retrofitting.

FIG. 5 shows the lift coefficient CL along the span L of the starboard wing 3. The span loading with the existing wing tip device 40a and movable flight control surface 30a are retrofitted as indicated by solid-line 60, whilst the span loading after the selected wing tip device 40a and selected movable flight control surface 30a are retrofitted is indicated by the dotted-line 60a.

FIG. 5 shows the increased lifting performance that can be achieved when using a selected wing tip device 40a in tandem with a corresponding selected movable flight control surface 30a, indicated by the increased lift coefficient across the section of span that includes the selected movable flight control surface 30a in comparison to the span loading with the existing wing 3.

Figure 6:
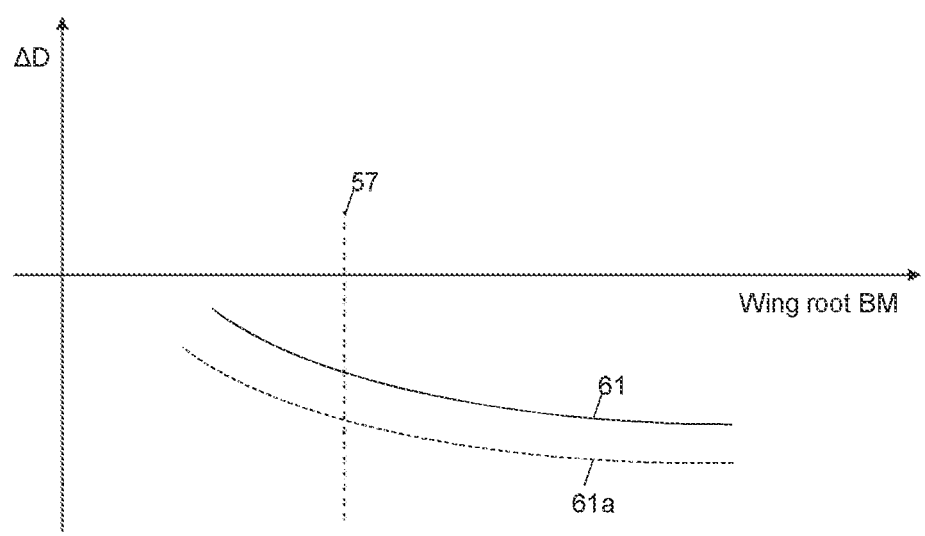
FIG. 6 shows an exemplary aircraft drag profile in relation to the wing bending moment before and after retrofitting.

FIG. 6 shows the change in aircraft drag D for a given wing root bending moment BM of the aircraft wing 3. The drag is shown as a solid-line 61 for an aircraft wing 3 that includes an existing flight control surface 30, whilst the dotted-line 61a indicates the drag for an aircraft wing 3 including the retrofitted selected flight control surface 30a and wing tip device 40a. The figure illustrates how the invention can minimise the induced drag for a given maximum allowable bending moment 55.

In each embodiment, it will be clear that the invention may be applicable to any aircraft wing with a movable flight control surface. A movable flight control surface may refer to, for example, an aileron, a flaperon or any other control surface configured to provide roll control.

Whenever a wing tip device 40, 40a is mentioned in the description, this may include, for example, a winglet, a raked wing tip, a wing tip fence, a wing tip cap, a wing tip extension or any other wing tip profile or device known in the art. The wing tip device 40, 40a may also be blended into the tip end of the main wing portion 20.

The wing tip device 40, 40a may be a "fixed" type, meaning that the wing tip device 40, 40a is non movable with respect to the wing 3, i.e. the wing tip device 40, 40a substantially does not rotate or otherwise move with respect to the wing 3 except for normal structural deflection. However, it may alternatively contain at least some portion that is movable with respect to the main wing portion 20. This may include a folding wing tip.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing having a root end, a tip end, a span extending between the root end and the tip end, a leading edge, a trailing edge and a chord extending between the leading edge and the trailing edge, and comprising:
    a main fixed wing portion having an inboard portion adjacent the root end, and an outboard portion adjacent the tip end;
    a wing tip device attached to the tip end of the wing; and
    a movable flight control surface connected at the outboard portion of the main fixed wing portion and having a leading edge, a trailing edge and a chord extending between the leading edge and the trailing edge,
    wherein a ratio of a local chord length of the movable flight control surface to a local chord length of the wing varies in the spanwise direction so that, from a top down view of the wing, the trailing edge of the aircraft wing portion inboard of the moveable flight control surface is not aligned with a trailing edge of the movable flight control surface.

2. The aircraft wing according to claim 1, wherein the ratio of the local chord length of the movable flight control surface to the local chord length of the wing increases or decreases in the spanwise direction.

3. The aircraft wing according to claim 1, wherein the wing tip device is blended into the tip end of the main wing portion.

4. The aircraft wing according to claim 1, wherein the control surface is an aileron, flaperon or other control surface configured to provide roll control.

5. The aircraft wing according to claim 1, wherein the leading edge and/or trailing edge of the movable flight control surface is straight.

6. An aircraft wing having a root end and a tip end and comprising:
    a main fixed wing portion having an inboard portion adjacent the root end, and an outboard portion adjacent the tip end;
    a wing tip device attached to the tip end of the wing; and
    a movable flight control surface connected at the outboard portion of the main fixed wing portion and having an inboard edge and an outboard edge, the movable flight control surface configured to be movable between a neutral position, in which the control surface has a zero degree angular deflection to the main fixed wing portion, and at least one deployed position, in which the control surface is deflected up or down with respect to the neutral position,
    wherein a camber of an aerofoil section of the wing including the inboard edge of the movable flight control surface in the neutral position, in which the control surface has a zero degree angular deflection to the main fixed wing portion, is different than a camber of an aerofoil section of the wing just inboard of the inboard edge of the movable flight control surface, and
    wherein the camber difference across the inboard edge of the movable flight control surface provides a step change of the camber profile in the wing spanwise direction.

7. The aircraft wing according to claim 6, wherein the wing tip device includes a winglet or a wing tip extension.

8. The aircraft wing according to claim 6, wherein the wing tip device is blended into the tip end of the main wing portion.

9. The aircraft wing according to claim 6, wherein the wing tip device is either fixed so as to be non-movable with respect to the main wing portion, or includes at least a movable portion.

10. The aircraft wing according to claim 6, wherein the control surface is an aileron, flaperon or other control surface configured to provide roll control.

* * * * *